(12) United States Patent
Lai et al.

(10) Patent No.: US 7,031,784 B1
(45) Date of Patent: Apr. 18, 2006

(54) SYSTEMS AND METHODS FOR MANUFACTURING EXECUTION SYSTEM INTEGRATION

(75) Inventors: Po-Chun Lai, Hsinchu Hsien (TW); Joshua Huang, Fuxing Xiang (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 0 days.

(21) Appl. No.: 11/021,050

(22) Filed: Dec. 23, 2004

(51) Int. Cl.
*G06F 19/00* (2006.01)
(52) U.S. Cl. .................. 700/96; 700/121; 709/217
(58) Field of Classification Search ................ 700/121, 700/95–96, 117; 709/217–219
See application file for complete search history.

(56) References Cited

U.S. PATENT DOCUMENTS

| | | | |
|---|---|---|---|
| 2002/0116083 A1* | 8/2002 | Schulze | 700/108 |
| 2002/0198964 A1* | 12/2002 | Fukazawa et al. | 709/219 |
| 2004/0187137 A1* | 9/2004 | Huang | 719/316 |

* cited by examiner

*Primary Examiner*—Zoila Cabrera
(74) *Attorney, Agent, or Firm*—Thomas, Kayden, Horstemeyer & Risley

(57) ABSTRACT

Systems and methods for MES (manufacturing execution system) integration. A Web server receives lot control data for a lot control operation performed in a MES server and selectively transmits the lot control data. A message encoder receives the lot control data from the Web server and encodes the lot control data in a lot control message for the MES server. A message controller receives the lot control message and directs the MES server to perform the lot control operation according to the lot control message.

17 Claims, 6 Drawing Sheets

SYSTEMS AND METHODS FOR MANUFACTURING EXECUTION SYSTEM INTEGRATION

BACKGROUND

The invention relates to system integration technology, and more particularly, to systems and methods for manufacturing execution system (MES) integration.

A conventional MES may be an integrated computer system representing the methods and tools used to accomplish semiconductor device production. For example, the primary functions of MES may include collecting manufacturing data in real time, organizing and storing the manufacturing data in a centralized database, work order management, fabrication tool management and process management. Examples of MES include Promis (Brooks Automation Inc. of Massachusetts), Workstream (Applied Materials, Inc. of California), Poseidon (IBM Corporation of New York), and Mirl-MES (Mechanical Industry Research Laboratories of Taiwan). Each MES may have a different application area. For example, Mirl-MES may be used in applications involving packaging, liquid crystal displays (LCDs), and printed circuit boards (PCBs), while Promis, Workstream, and Poseidon may be used for IC fabrication and thin film transistor LCD (TFT-LCD) applications.

Typically, different MESs respectively include different software interfaces to remotely execute process controls, such as creating an empty wafer lot, holding a wafer lot, banking a wafer lot, releasing a held wafer lot, releasing a banked wafer lot, and the like. As a result, different software interfaces must be learned by operators, thereby decreasing operating performance. In view of this limitation, a need exists for systems and methods for providing a common interface to execute process control operations in various MESs.

SUMMARY

Systems for MES (Manufacturing Execution System) integration are provided. An exemplary embodiment comprises a Web server, a message encoder and a message controller. The Web server receives lot control data for a lot control operation performed in a MES server and selectively transmits the lot control data. The message encoder receives the lot control data from the Web server and encodes the lot control data in a lot control message for the MES server. The message controller receives the lot control message and directs the MES server to perform the lot control operation according to the lot control message. The exemplary embodiment may further comprise an outbound messaging system and an inbound messaging system. The outbound messaging system receives the lot control message and provides store-and-forward operation to transmit the lot control message to the inbound messaging system. The message controller may receive the lot control message from the inbound messaging system. The message controller issues commands to the MES server according to the lot control message when the MES server is a Promis MES server. The message controller creates at least one database record for the MES server according to the lot control message while the MES server is Poseidon MES server.

MES integration methods are further provided. An exemplary method receives lot control data for a lot control operation performed in a MES server, selectively encodes the lot control data in a lot control message for the MES server and directs the MES server to perform the lot control operation according to the lot control message. The exemplary method may further transmit the lot control message via an outbound messaging system providing store-and-forward operation, and receive the lot control message from the outbound messaging system via an inbound messaging system. The exemplary method may further issue commands to the MES server according to the lot control message when the MES server is a Promis MES server. The exemplary method may further create at least one database record for the MES server according to the lot control message when the MES server is a Poseidon MES server. Fabrication of at least one semiconductor device in a wafer lot utilizes the disclosed method.

The lot control operation may be performed to create a new lot, hold a lot, bank a lot, release a held lot or release a banked lot. The lot control message may be compatible with extensible Markup Language (XML) format.

BRIEF DESCRIPTION OF THE DRAWINGS

MES (Manufacturing Execution System) integration systems and methods will become apparent by referring to the following detailed description with reference to the accompanying drawings, wherein.

DESCRIPTION

Figure 1:
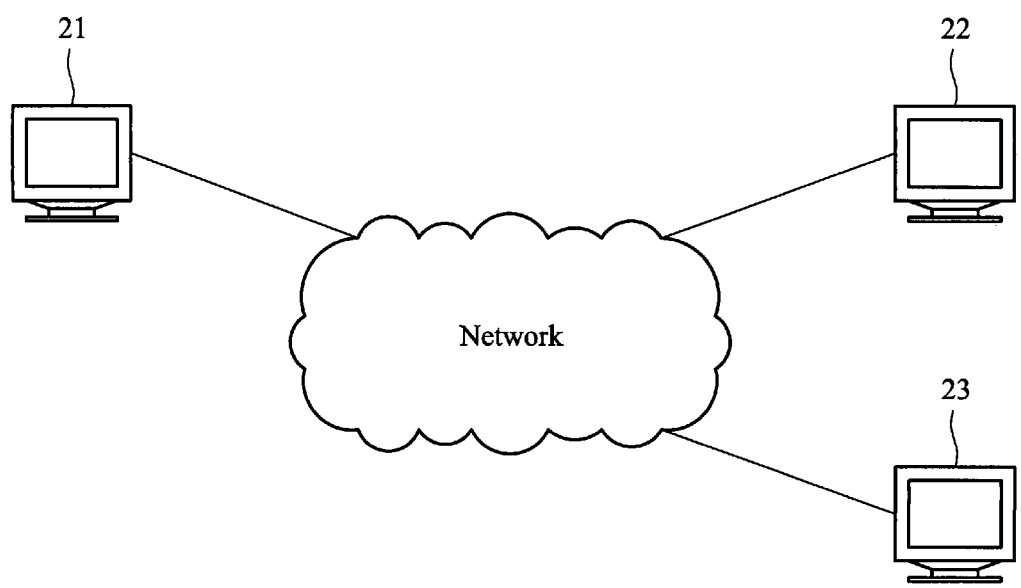
FIG. 1 is a diagram of an embodiment of the network architecture of MES (manufacturing execution system) integration.

FIG. 1 is a diagram of an embodiment of the network architecture of MES (manufacturing execution system) integration. An embodiment of the Web MES integration system 20 comprises computers 21, 22 and 23. Computers 21, 22 and 23 operate in a networked environment (preferably Internet or Intranet) using logical connections to each other. Those skilled in the art will recognize that the computers 21, 22 and 23 may be connected in different types of networking environments, and communicate between different types of networking environments through various types of transmission devices such as routers, gateways, access points, base station systems or others.

Figure 2:
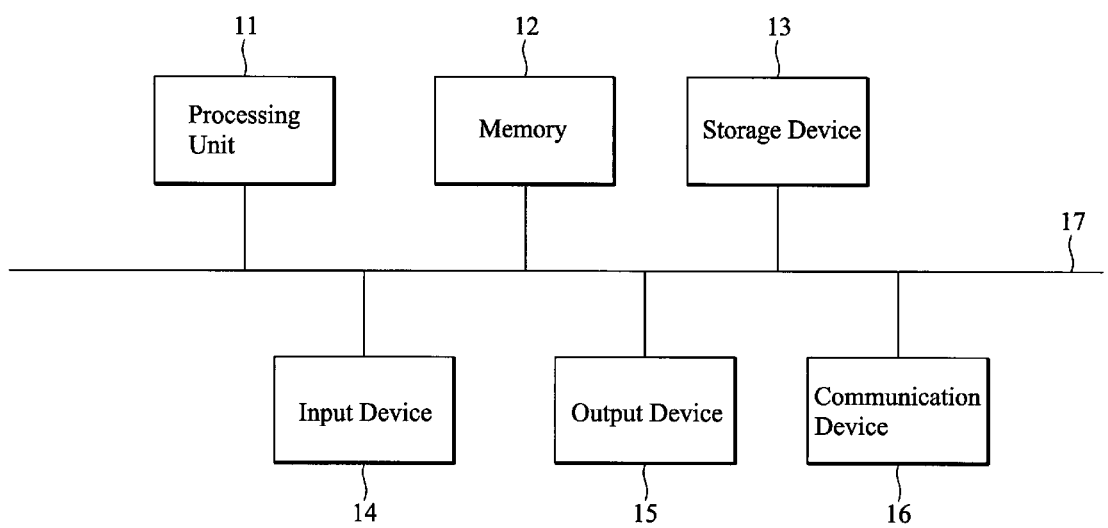
FIG. 2 is a diagram of a hardware environment applicable to computers in an embodiment of MES integration system.

FIG. 2 is a diagram of a hardware environment applicable to computers in an embodiment of MES integration system. The description of FIG. 2 provides a brief, general description of suitable computer hardware and a suitable computing environment for computers 21, 22 and 23 in conjunction with which at least some embodiments of the invention may be implemented. The hardware environment of FIG. 2 includes a processing unit 11, a memory 12, a storage device 13, an input device 14, an output device 15 and a communication device 16. The processing unit 11 is connected by buses 17 to the memory 12, storage device 13, input device 14, output device 15 and communication device 16 based on Von Neumann architecture. There may be one or more processing units 11, such that the processor of the computer comprises a single central processing unit (CPU), a micro processing unit (MPU) or multiple processing units, commonly referred to as a parallel processing environment. The memory 12 is preferably a random access memory (RAM), but may also include read-only memory (ROM) or flash ROM. The memory 12 preferably stores program modules executed by the processing unit 11 to perform MES integration functions. Generally, program modules include routines, programs, objects, components, scripts, Web pages, or others, that perform particular tasks or implement particular abstract data types. Moreover, those skilled in the art will understand that at least some embodiments may be practiced with other computer system configurations, including handheld devices, multiprocessor-based, microprocessor-based or programmable consumer electronics, network PCs, minicomputers, mainframe computers, and the like. Some embodiments may also be practiced in distributed computing environments where tasks are performed by remote processing devices linked through a communication network. In a distributed computing environment, program modules may be located in both local and remote memory storage devices based on various remote access architecture such as DCOM, CORBA, Web objects, Web Services or other similar architectures. The storage device 13 may be a hard drive, magnetic drive, optical drive, a portable drive, or nonvolatile memory drive. The drives and associated computer-readable media thereof (if required) provide nonvolatile storage of computer-readable instructions, data structures and program modules. The processing unit 11, controlled by program modules received from the memory 12 and from an operator through the input device, directs MES integration functions.

Figure 3:
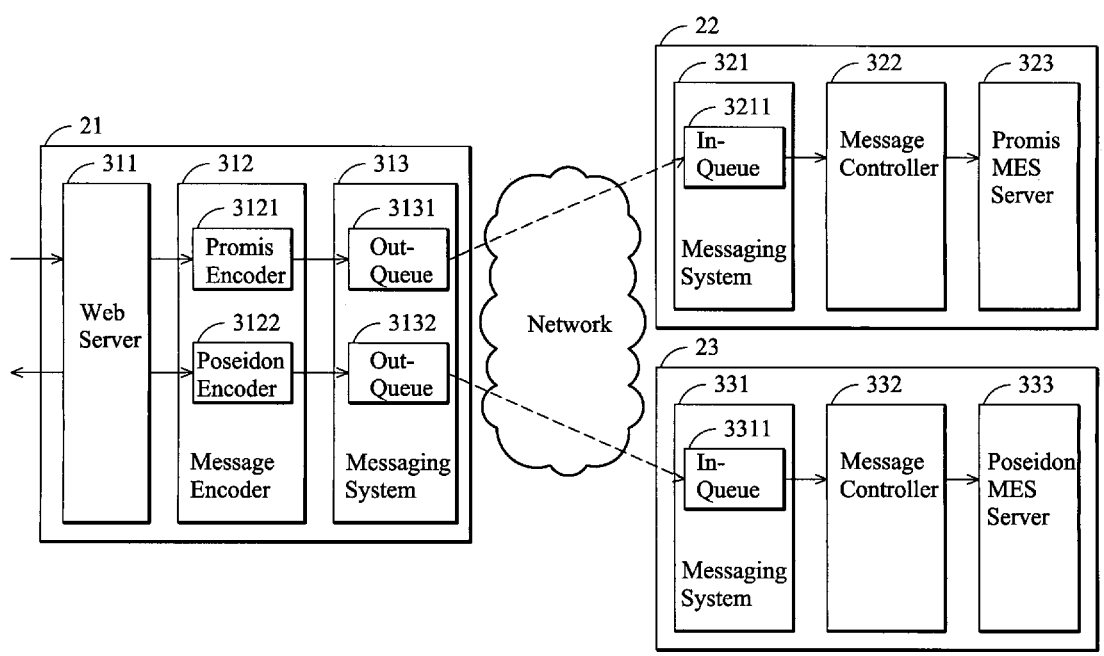
FIG. 3 is a diagram of an embodiment of the system architecture of MES integration.

FIG. 3 is a diagram of an embodiment of the system architecture of MES integration. The computer 21 comprises a Web server 311, a message encoder 312 including a Promis encoder 3121 and a Poseidon encoder 3122, and a messaging system 313 including two out-queues 3131 and 3132. The computer 22 comprises a messaging system 321 including an in-queue 3211, a message controller 322 and a Promis MES server (Brooks Automation Inc. of Massachusetts). The computer 23 comprises a messaging system 331 including an in-queue 3311, a message controller 332 and a Poseidon MES server (IBM Corporation of New York). It is noted that the Web server 311, message encoder 312, message controllers 322 and 332, Promis MES server 323 and Poseidon MES server 333 may be integrated in a single computer, such that the messaging systems 313, 321 and 331 can be omitted.

The Web server 311, message encoder 312 and messaging system 313 are executed by a processing unit 11 in the computer 21. The Web server 311, such as Internet Information Services (IIS) server (Microsoft Inc.), Apache server, Sun Java System Web Server (Sun Micro Inc.), Lotus Domino server (IBM Inc.) and the like, comprises several Web pages in response to hypertext transfer protocol (HTTP) requests. Generally, information provided by the web server is in the form of Web pages, generally in HTML (HyperText mark-up language) format, a text-based format that describes how the respective Web page is to be displayed by a computer, and provides textual information, typically in ASCII form, and graphical information generally in a compressed format such as "GIF" or "JPEG." Such HTML documents may include scripts (e.g., JavaScript, Visual Basic Scripts, Active Server Page Scripts and the like) that provides for some MES integration management functionality. At least one Web page is utilized as a common portal to direct various MESs to perform lot control operations, such as creating new lots, holding lots, banking lots, releasing held lots, releasing banked lots, and the like. Program codes in the Web page determine a target MES that lot control operations will be performed, and selectively transmit lot control data provided by operators to a specific encoder, such as the Promis encoder 3121 or the Poseidon encoder 3122. The Promis encoder 3121 encodes lot control data in a lot control message, preferably an extensible markup language (XML) message, with a proprietary format recognized by the message controller 322. The Poseidon encoder 3122 encodes lot control data in a lot control message, preferably a XML message, with a proprietary format recognized by the message controller 332. The computer 21 may additionally equip a messaging system 313, such as MSMQ (Microsoft Inc.), BEA MessageQ (BEA Inc.), Sun ONE Message Queue (Sun Micro Inc.), WebSphere MQ (IBM Inc.) and the like, to provide capability of message transformation for remote lot control. The messaging system 313 provides a store-and-forward operation and guarantees that the lot control message can be successfully delivered to computer 22 or computer 23 with a relevant messaging system. The messaging system 313 listens to out-queues 3131 and 3132, and when a lot control message is stored to one of the out-queues, transfers the stored message to a relevant in-queue in the computer 21 or 22.

The messaging server 321, message controller 322 and the Promis MES server 323 are executed by a processing unit 11 in the computer 22. The messaging system 321 listens to in-queue 3211, and when a lot control message is received from the messaging system 313, transfers the stored message to the message controller 322. Integrated circuits are typically fabricated by processing one or more wafers as a "lot" with a series of wafer fabrication tools (i.e., "processing tools"). The message controller 322 directs the Promis MES server 323 to execute lot control operations, such as creating new lots, holding lots, banking lots, releasing held lots, releasing banked lots and the like, according to the received lot control message.

The messaging server 331, message controller 332 and the Poseidon MES server 333 are executed by a processing unit 11 in the computer 23. The messaging system 331 listens to in-queue 3311, and when a lot control message is received from the messaging system 313, transfers the stored message to the message controller 332. The message controller 332 directs the Poseidon MES server 333 to execute lot control operations, such as creating new lots, holding lots, banking lots, releasing held lots, releasing banked lots and the like, according to the received lot control message.

Figure 4:
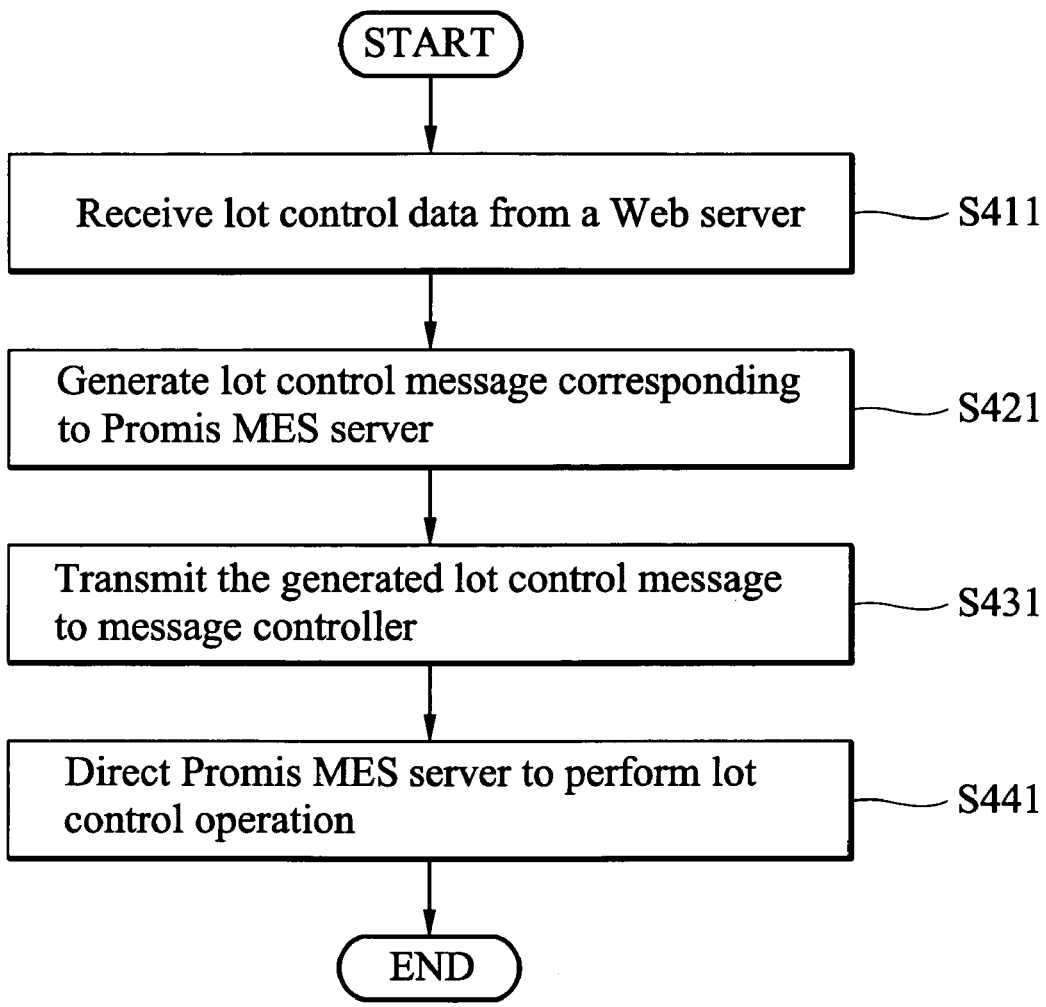
FIG. 4 is a flowchart showing an embodiment of a MES integration method for directing a Promis MES server to perform a lot control operation.

MES integration methods are also provided. Fabrication of at least one semiconductor device in a wafer lot controlled by a specific MES utilizes the disclosed method. FIG. 4 is a flowchart showing an embodiment of a MES integration method for directing the Promis MES server 323 to perform a lot control operation. In step S411, lot control data for directing the Promis MES server 323 to perform a lot control operation, such as creating a new lot, holding a lot, banking a lot, releasing a held lot, releasing a banked lot and the like, is received from the Web server 311. In step S421, a lot control message, preferably in XML format, for the Promis MES server 323 is generated by encoding the received lot control data. These XML messages use a pair of tags to structure messages into text, thereby enabling a XML message parser to decode XML messages. For example, customer order numbers may be bracketed by a pair of tags, <CUSTOMERORDERNUMBER> and </CUSTOMERORDERNUMBER>, product identities may be bracketed by a pair of tags, <PARTNAME> and </PARTNAME>, and lot quantities may be bracketed by a pair of tags, <STARTSIZE> and </STARTSIZE>. Note that tag names are relevant for the Promis MES server 323. Those skilled in the art will recognize that customer order numbers, product identities and lot quantities may also be provided in attribute values in a particular XML element, for example, <CREATELOT CUSTOMERORDERNUMBER=" . . . " PARTNAME=" . . . " STARTSIZE=" . . . "/>. In step S431, the generated lot control message is transmitted to the message controller 322, preferably via messaging servers 313 and 321. In step S441, at least one lot control command is issued to the Promis MES server 323 according to the lot control message by the message controller 322 to direct the Promis MES server 323 to perform a lot control operation.

Figure 5:
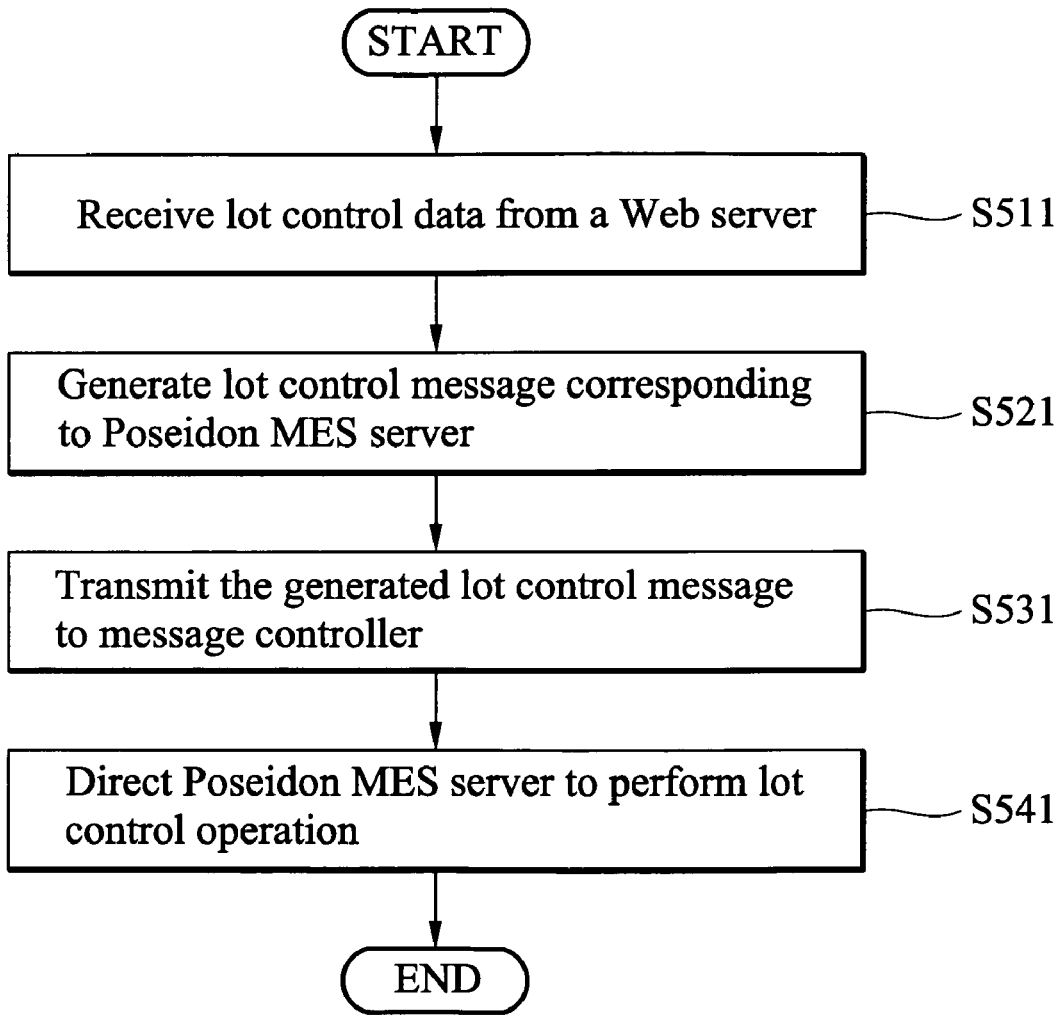
FIG. 5 is a flowchart showing an embodiment of a MES integration method for directing a Poseidon MES server to perform a lot control operation.

FIG. 5 is a flowchart showing an embodiment of a MES integration method for directing the Poseidon MES server 333 to perform a lot control operation. In step S511, lot control data for directing the Poseidon MES server 333 to perform a lot control operation, such as creating a new lot, holding a lot, banking a lot, releasing a held lot, releasing a banked lot, is received from the Web server 311. In step S521, a lot control message, preferably in XML format, for the Poseidon MES server 333 is generated by encoding the received lot control data. For example, customer order numbers may be bracketed by a pair of tags, <CUSTOMERORDERNO> and </CUSTOMERORDERNO>, product identities may be bracketed by a pair of tags, <PRODUCTID> and </PRODUCTID>, and lot quantities may be bracketed by a pair of tags <QTY> and </QTY>. Additional information for lot priority may be required to be bracketed by a pair of tags, <PRIORITY> and </PRIORITY>, only for the POSEIDON MES server 333. Note that tag names are relevant for the POSEIDON MES server 333. Those skilled in the art will recognize that customer order numbers, product identities and lot quantities may also be provided in attribute values in a particular XML element, for example, <CREATELOT CUSTOMERORDERNO=" . . . " PRODUCTID=" . . . " QTY=" . . . "/>. In step S431, the generated lot control message is transmitted to the message controller 332, preferably via messaging servers 313 and 331. In step S441, at least one database manipulation command is issued to create at least one database record according to the lot control message by the message controller 332, enabling the Poseidon MES server 333 to perform a lot control operation according to the created database record.

Although embodiments of the invention have been described applied in three computers, this is not intended to limit the invention. Those skilled in this technology can make certain variations in computer deployment to apply the disclosed MES integration functions.

Figure 6:
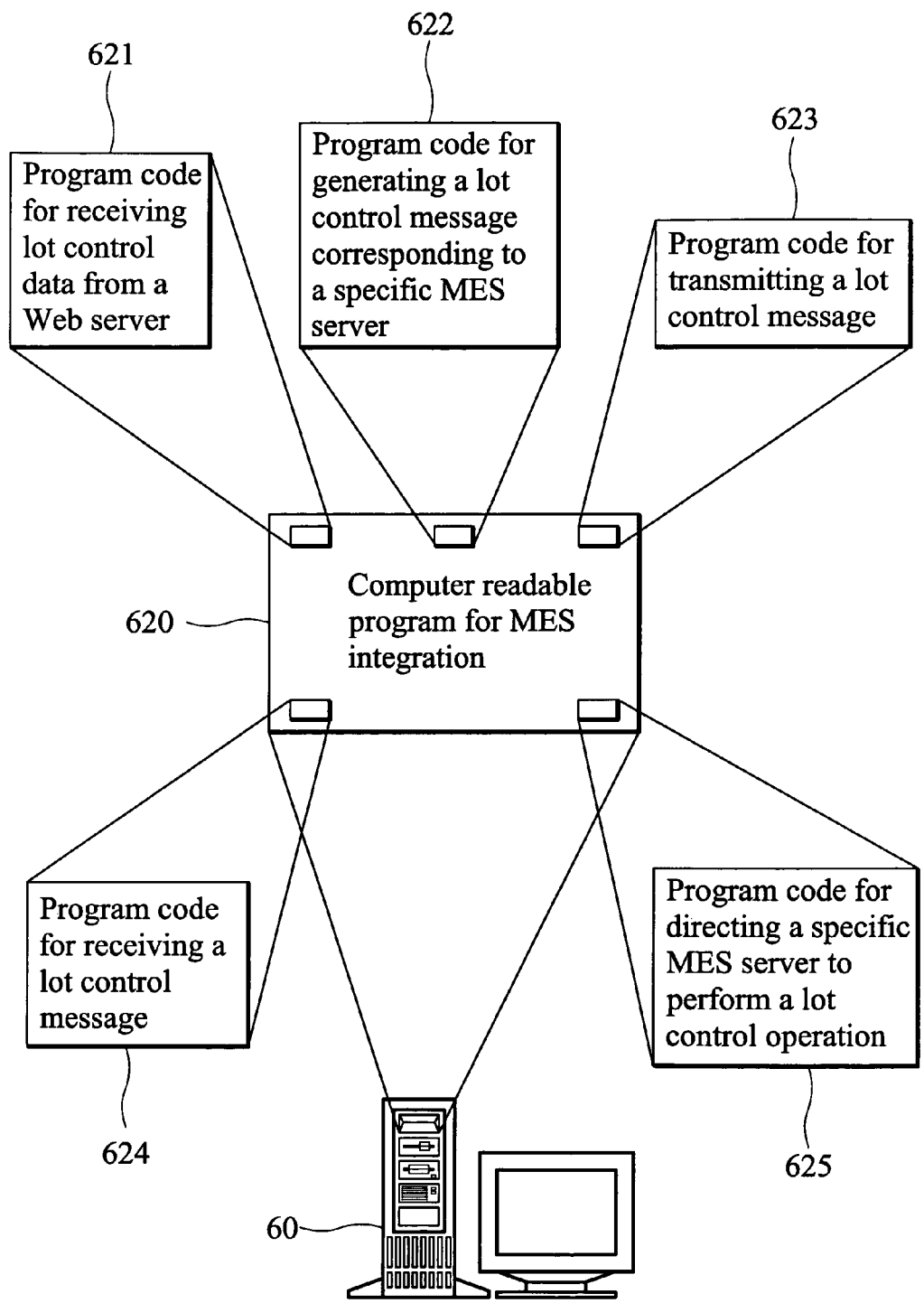
FIG. 6 is a diagram of a storage medium for storing a computer program providing the method of MES integration.

Also disclosed is a storage medium as shown in FIG. 6 storing a computer program 620 providing the disclosed method of MES integration. The computer program product includes a storage medium 60 having computer readable program code embodied therein for use in a computer system. The computer readable program code comprises at least computer readable program code 621 receiving lot control data from a Web server, computer readable program code 622 generating a lot control message corresponding to a specific MES server, computer readable program code 623 transmitting a lot control message, computer readable program code 624 receiving a lot control message, and computer readable program code 625 directing a specific MES server to perform a lot control operation.

Although embodiments of the invention have been described in Promis, Poseidon MES servers, it is not intended to limit the invention. Those who are skilled in this technology can still apply the disclosed embodiments to other MES servers, such as SiView, Workstream, Mirl-MES and the like.

The methods and systems of the embodiments, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the invention has been described in terms of preferred embodiment, it is not intended to limit the invention thereto. Those skilled in this technology can make various alterations and modifications without departing from the scope and spirit of the invention. Therefore, the scope of the invention shall be defined and protected by the following claims and their equivalents.

What is claimed is:

1. A system for MES (Manufacturing Execution System) integration, comprising:
   a Web server;
   a first message encoder;
   a second message encoder;
   a first message controller coupling to a first MES server; and
   a second message controller coupling to a second MES server,
   wherein the Web server receives lot control data corresponding to a lot control operation to be performed in one MES server of a first MES server and a second MES server, selects one message encoder of the first and second message encoders contingent upon information indicating which MES server will perform the lot control operation and transmits the lot control data to the selected message encoder, the first message encoder encodes the lot control data in a first lot control message recognized by the first message controller when receiving the lot control data, the second message encoder encodes the lot control data in a second lot control message recognized by the second message controller when receiving the lot control data, the first message controller directs the first MES server to perform the lot control operation when receiving the first lot control message and the second message controller directs the second MES server to perform the lot control operation when receiving the second lot control message.

2. The system of claim 1 wherein the lot control operation is performed to create a new lot, hold a lot, bank a lot, release a held lot or release a banked lot.

3. The system of claim 1 further comprising:
   a first inbound messaging system coupling to the first message controller;

a second inbound messaging system coupling to the second message controller; and an outbound messaging system, wherein the outbound messaging system listens to a first out-queue, when detecting that the first lot control message is stored in the first out-queue, transfers the stored first lot control message to the first inbound messaging system, and, when detecting that the second lot control message is stored in the second out-queue, transfers the stored second lot control message to the second inbound messaging system, the first inbound messaging system listens to a first in-queue, and, when detecting that the first lot control message is stored in the first in-queue, transfers the stored first lot control message to the first message controller, and the second inbound messaging system listens to a second in-queue, and, when detecting that the second lot control message is stored in the second in-queue, transfers the stored second lot control message to the second message controller.

4. The system of claim 3 wherein the outbound messaging system provides store-and-forward operation to transmit the lot control message to the first and second inbound messaging systems.

5. The system of claim 1 wherein the first and second lot control messages are compatible with extensible Markup Language (XML) format.

6. The system of claim 1 wherein the first MES server is a Promis MES server and the second MES server is a Poseidon MES server.

7. The system of claim 6 wherein the first message controller issues commands to the Promis MES server according to the first lot control message, enabling the Promis MES server to perform the lot control operation, and the second message controller creates at least one database record for the Poseidon MES server according to the second lot control message, enabling the Poseidon MES server to perform the lot control operation.

8. The system of claim 6 further comprising:

a first inbound messaging system coupling to the first message controller;

a second inbound messaging system coupling to the second message controller; and an outbound messaging system, wherein the outbound messaging system listens to a first out-queue, when detecting that the first lot control message is stored in the first out-queue, transfers the stored first lot control message to the first inbound messaging system, and, when detecting that the second lot control message is stored in the second out-queue, transfers the stored second lot control message to the second inbound messaging system, the first inbound messaging system listens to a first in-queue, and, when detecting that the first lot control message is stored in the first in-queue, transfers the stored first lot control message to the first message controller, the second inbound messaging system listens to a second in-queue, and, when detecting that the second lot control message is stored in the second in-queue, transfers the stored second lot control message to the second message controller, the first message controller issues commands to the Promis MES server according to the first lot control message, enabling the Promis MES server to perform the lot control operation, and the second message controller creates at least one database record for the Poseidon MES server according to the second lot control message, enabling the Poseidon MES server to perform the lot control operation.

9. A method of MES (Manufacturing Execution System) integration using at least one computer, comprising:

receiving lot control data corresponding to a lot control operation to be performed in one MES server of a first MES server and a second MES server;

selecting one message encoder of a first message encoder and a second message encoder contingent upon information indicating which MES server will perform the lot control operation;

transmitting the lot control data to the selected message encoder;

when receiving the lot control data with the first message encoder, encoding the lot control data in a first lot control message recognized by a first message controller coupling to the first MES server;

when receiving the lot control data with the second message encoder, encoding the lot control data in a second lot control message recognized by a second message controller coupling to the second MES server;

when detecting the first lot control message, directing the first MES server to perform the lot control operation; and when detecting the second lot control message, directing the second MES server to perform the lot control operation.

10. The method of claim 9 wherein the lot control operation is performed to create a new lot, hold a lot, bank a lot, release a held lot or release a banked lot.

11. The method of claim 9 further comprising:

listening to a first out-queue and a second out-queue;

when detecting that the first lot control message is stored in the first out-queue, transferring the to a first in-queue;

when detecting that the second lot control message is stored in the second out-queue, transferring the stored second lot control message to a second in-queue;

listening to the first in-queue and the second in-queue;

when detecting that the first lot control message is stored in the first in-queue, directing the first MES server to perform the lot control operation; and when detecting that the second lot control message is stored in the second in-queue, directing the second MES server to perform the lot control operation.

12. The method of claim 9 wherein the first and second lot control messages are compatible with eXtensible Markup Language (XML) format.

13. The method of claim 9 wherein the first MES server is a Promis MES server and the second MES server is a Poseidon MES server.

14. The method of claim 13 further comprising:

when detecting the first lot control message, issuing commands to the Promis MES server according to the first lot control message, enabling the Promis MES server to perform the lot control operation; and when detecting the second lot control message, creating at least one database record for the Poseidon MES server according to the second lot control message, enabling the Poseidon MES server to perform the lot control operation.

15. The method of claim 13 further comprising:

listening to a first out-queue and a second out-queue:

when detecting that the first lot control message is stored in the first out-queue, transferring the to a first in-queue;

when detecting that the second lot control message is stored in the second out-queue, transferring the stored second lot control message to a second in-queue;

listening to the first in-queue and the second in-queue;

when detecting that the first lot control message is stored in the first in-queue, issuing commands to the Promis MES server according to the first lot control message, enabling the Promis MES server to perform the lot control operation; and when detecting that the second lot control message is stored in the second in-queue, creating at least one database record for the Poseidon MES server according to the second lot control message, enabling the Poseidon MES server to perform the lot control operation.

16. A semiconductor device in a wafer lot, fabricated by a method comprising:

receiving lot control data corresponding to a lot control operation to be performed in one MES server of a first MES server and a second MES server;

selecting one message encoder of a first message encoder and a second message encoder contingent upon information indicating which MES server will perform the lot control operation;

transmitting the lot control data to the selected message encoder;

when receiving the lot control data with the first message encoder, encoding the lot control data in a first lot control message recognized by a first message controller coupling to the first MES server;

when receiving the lot control data with the second message encoder, encoding the lot control data in a second lot control message recognized by a second message controller coupling to the second MES server;

when detecting the first lot control message, directing the first MES server to perform the lot control operation; and when detecting the second lot control message, directing the second MES server to perform the lot control operation.

17. The semiconductor device of claim 16 wherein the lot control operation is performed to create a new lot, hold a lot, bank a lot, release a held lot or release a banked lot.

* * * * *